United States Patent [19]

Cepuran

[11] Patent Number: 5,628,001
[45] Date of Patent: May 6, 1997

[54] POWER SAVING METHOD AND APPARATUS FOR CHANGING THE FREQUENCY OF A CLOCK IN RESPONSE TO A START SIGNAL

[75] Inventor: Lawrence D. Cepuran, Cary, Ill.

[73] Assignee: Motorola, Inc., Schaumburg, Ill.

[21] Appl. No.: 529,766

[22] Filed: Sep. 18, 1995

Related U.S. Application Data

[63] Continuation of Ser. No. 980,012, Nov. 23, 1992, abandoned.

[51] Int. Cl.$^6$ .................. G06F 1/04; G06F 1/08
[52] U.S. Cl. ............... 395/556; 340/825.44; 364/707; 395/878; 395/881; 395/750; 455/343
[58] Field of Search .................. 340/825.06, 825.44, 340/825.57, 825.62; 370/85.1, 110.1; 364/707; 395/200.12, 200.13, 200.14, 878, 880, 881, 285, 290, 550, 800, 775; 455/393

[56] References Cited

U.S. PATENT DOCUMENTS

| | | | |
|---|---|---|---|
| 3,941,989 | 3/1976 | McLaughlin et al. | 235/156 |
| 4,095,267 | 6/1978 | Morimoto | 395/550 |
| 4,143,418 | 3/1979 | Hodge | 395/250 |
| 4,435,761 | 3/1984 | Kimoto | 395/550 |
| 4,479,261 | 10/1984 | Oda et al. | 455/343 |
| 4,506,386 | 3/1985 | Ichikawa et al. | 455/343 |
| 4,523,274 | 6/1985 | Fukunaga et al. | 395/287 |
| 4,545,030 | 10/1985 | Kitchin | 395/550 |
| 4,839,639 | 6/1989 | Sato et al. | 340/825.44 |
| 4,860,003 | 8/1989 | DeLuca et al. | 340/825.44 |
| 5,027,428 | 6/1991 | Ishiguro et al. | 455/67 |
| 5,097,437 | 3/1992 | Larson | 395/775 |
| 5,109,521 | 4/1992 | Culley | 395/800 |
| 5,123,107 | 6/1992 | Mensch, Jr. | 395/800 |
| 5,133,064 | 7/1992 | Hotta et al. | 395/550 |
| 5,136,180 | 8/1992 | Caviasca et al. | 307/269 |
| 5,187,471 | 2/1993 | Wagai et al. | 340/825.44 |
| 5,193,212 | 3/1993 | Son | 455/38.3 |
| 5,206,888 | 4/1993 | Hiraguchi et al. | 377/20 |
| 5,230,071 | 7/1993 | Newman | 395/550 |
| 5,274,796 | 12/1993 | Conner | 395/550 |
| 5,301,306 | 4/1994 | Plog | 395/550 |

OTHER PUBLICATIONS

Intel Corp., "Intel 82347 Power Management PC Peripheral", pp. 1–30 (Preliminary May 1990).

*Primary Examiner*—Lance Leonard Barry, Esq.
*Attorney, Agent, or Firm*—Randall S. Vaas

[57] ABSTRACT

At least two circuit elements are interconnected by a bus which permits transmission of information between the circuit elements. A clock signal generator generates a clock signal alternately of at least two frequencies, namely, a low frequency and a high frequency. When information is not transmitted upon the bus, the clock signal generator generates the clock signal of the low frequency, and the circuit is operated at the low frequency level. When information is generated upon the bus, the clock signal generator generates a clock signal of the high frequency and the circuit is operated at the high frequency. Detection of a start bit, for example, forming a first bit of a word transmitted upon the bus, once detected, causes the clock signal generator to generate the clock signal of the increased frequency. Because the power consumption of an electrical circuit is proportional to the frequency at which the circuit is operated, the circuit is operated at minimal power levels except during times in which information is transmitted.

10 Claims, 4 Drawing Sheets

POWER SAVING METHOD AND APPARATUS FOR CHANGING THE FREQUENCY OF A CLOCK IN RESPONSE TO A START SIGNAL

This application is a continuation of application Ser. No. 07/980,012 which was filed Nov. 23, 1992 and is now abandoned.

FIELD OF THE INVENTION

The present invention relates generally to electronic circuits having clock signal generators forming portions thereof and, more particularly, to an electronic circuit, and associated method, operable at either of at least two frequency levels.

BACKGROUND OF THE INVENTION

A communication system is operative to transmit information between two or more locations and includes, at a minimum, a transmitter and a receiver interconnected by a communication channel. A radio communication system is a communication system in which the communication channel comprises a radio frequency channel wherein the radio frequency channel is defined by a range of frequencies of the communication spectrum.

The transmitter which forms a portion of the radio communication system includes circuitry for converting the information into a form suitable for transmission thereof upon a radio frequency channel. Such circuitry includes modulation circuitry which performs a process referred to as modulation. In such a process, the information which is to be transmitted is impressed upon a radio frequency electromagnetic wave, commonly referred to as a carrier signal. The resultant signal is commonly referred to as a modulated signal. Such resultant signal is also referred to as a communication signal as the modulated signal includes the information which is to be communicated between the transmitter and the receiver.

Radio communication systems are advantageous in that no physical interconnection is required between the transmitter and the receiver; once the information signal is modulated to form a modulated signal, the modulated signal may be transmitted over large distances.

A two-way radio communication system is a radio communication system, similar to the radio communication system above-described, but which further permits both transmission of information to a location, and transmission of information from that location. Each location of such a two-way radio communication system contains both a transmitter and a receiver. The transmitter and the receiver positioned at a single location typically comprise a unit referred to as a radio transceiver or, more simply, a transceiver.

A cellular communication system is a type of two-way radio communication system in which communication is permitted with a radio transceiver positioned at any location within a geographic area encompassed by the cellular communication system.

A cellular communication system is created by positioning a plurality of fixed-site radio transceivers, referred to as base stations, at spaced-apart locations throughout the geographic area. The base stations are connected to a conventional, wireline, telephonic network. Each base station has associated therewith a portion of the geographic area located proximate to each of such base stations. Such portions are referred to as cells. The plurality of cells, each defined by corresponding ones of the base stations of the plurality of base stations, together define the coverage area of the cellular communication system. A radio transceiver, referred to in a cellular communication system as a radiotelephone, positioned at any location within the coverage area of the cellular communication system is able to communicate with a user of the conventional wireline, telephonic network by way of a base station. Communication signals generated by the radiotelephone are transmitted to a base station, and then, by way of the conventional, wireline, telephonic network to a desired wireline location to effectuate thereby telephonic communication therewith. Telephonic communication may also be effectuated with the radiotelephone upon initiation at the wireline location.

One type of radiotelephone construction is commonly referred to as a portable radiotelephone as such construction of radiotelephone is of dimensions permitting carriage thereof by a user. A portable power supply, typically comprised of a battery pack having one or more battery cells, is affixed to, to be carried with, the portable radiotelephone. Such portable power supply is suitably connected to the radiotelephone to provide power to the radiotelephone during operation thereof.

Because a battery stores only a finite amount of energy, operation of the portable radiotelephone is limited by the energy storage capacity of the portable power supply. Powering of the portable radiotelephone by the portable power supply depletes the power supply of stored energy. Once the portable power supply becomes discharged, replacement of such supply is necessitated to permit continued operation of the radiotelephone.

While the energy storage capacity of the portable power supply may be increased, such increase in capacity typically only may be effectuated with a concomitant increase in the size and weight of the portable power supply. Such increase in the energy storage capacity of the portable power supply may only, therefore, be effectuated by decreasing the portability of the assembly comprised of the portable radiotelephone and portable power supply carried therewith.

Accordingly, efforts have been made to increase the period of operability of the portable radiotelephone when powered by a single, portable power supply by reducing the amounts of power required to operate the portable radiotelephone. By increasing the efficiency of operation of the circuitry of the radiotelephone, an increase in the period of operability of the radiotelephone may be effectuated even without an increase in the energy storage capacity of the power supply used to provide power to the radiotelephone to permit operation thereof.

Circuitry which permits operation of the radiotelephone while requiring lesser amounts of power for operation of such radiotelephone will further increase the period of operability thereof.

SUMMARY OF THE INVENTION

The present invention, accordingly, advantageously provides circuitry, and an associated method, which minimizes the amount of power consumed by such circuitry during operation thereof.

The present invention further advantageously provides a radiotelephone construction incorporating circuitry permitting operation of such radiotelephone at a reduced, average power level.

The present invention includes further advantages and features, the details of which will become more readily apparent when reading the following detailed description of the preferred embodiments hereinbelow.

In accordance with the present invention, an electrical circuit, and an associated method, is disclosed. The electrical circuit includes a first circuit element operative at least to generate an information signal. A second circuit element is operative at least to receive an information signal. A bus interconnects the first circuit element and the second circuit element, thereby to permit transmission of the information signal generated by at least the first circuit element thereupon and to permit reception by at least the second circuit element of the information signal generated thereupon. A clock signal generator generates a clock signal alternately of a frequency below a first level when the information signal is not transmitted upon the bus or of a frequency above a second level when the clock signal generator receives an indication that the information signal is to be generated upon the bus.

BRIEF DESCRIPTION OF THE DRAWINGS

The present invention will be better understood when read in light of the accompanying drawings in which.

DESCRIPTION OF THE PREFERRED EMBODIMENTS

A large number of electronic circuits include clock signal generators as portions thereof. Such clock signal generators generate clock signals which oscillate at periodic frequencies. The clock signals are sometimes referred to as pulse trains, particularly when the clock signals are limited in magnitude, such as by signal "clipping circuitry" or when the clock signals are applied to digital circuits. The terms clock signal and pulse train shall, at times, be used interchangeably hereinbelow.

Pulse trains formed of such clock signals generated by clock signal generators are typically provided as input signals to other elements of the electronic circuit of which the clock signal generator forms a portion. The input signals comprised of such pulse trains are typically utilized to control the rate of operation of the elements to which the pulse trains are applied. That is to say, the elements to which the pulse trains are applied typically perform operations responsive to detection of a rising or falling edge portion of individual pulses of the pulse trains.

Accordingly, an increase in frequency of a pulse train formed of a clock signal generated by a clock signal generator increases the rate of operation of an electrical circuit comprised of the elements to which a clock signal is applied. Conversely, a decrease in the frequency of the pulse train formed of the clock signal generated by the clock signal generator decreases the rate of operation of the electrical circuit comprised of the elements to which the clock signal is applied.

Figure 1:
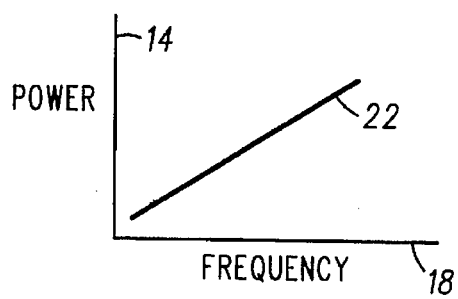
FIG. 1 is a graphical representation illustrating the relationship between the clock frequency of a clock signal generator forming a portion of an electrical circuit and the power consumption of the electrical circuit during operation thereof.

FIG. 1 is a graphical representation of the relationship between the frequency of the clock signal generated by a clock signal generator and the power consumed during operation of a typical electrical circuit of which the clock signal generator forms a portion. The power consumed during operation of such electrical circuit is plotted along ordinate axis 14 as a function of the frequency of the clock signal generated by the clock signal generator of the electrical circuit. Abscissa axis 18 is, hence, scaled in terms of frequency.

Line 22, formed as a result of a plot of such relationship, indicates that the power consumed by the electrical circuit is directly proportional to the frequency of the clock signal. Accordingly, when the electrical circuit is operated at a higher frequency (i.e., when the clock signal generator which forms a portion of such electrical circuit is operative to generate a clock signal of an increased frequency), greater amounts of power are consumed by the electrical circuit. Conversely, when the electrical circuit is operated at a lower frequency (i.e., when the clock signal generator which forms a portion of the electrical circuit is operative to generate a clock signal of a reduced frequency) lesser amounts of power are consumed by the electrical circuit.

Because the increased rate of circuit operation is generally advantageous, operation of the electrical circuit at the greatest possible frequency of operation is generally attempted. However, as the graphical representation of FIG. 1 illustrates, such operation of the electrical circuit at the highest possible frequency results in the highest rate of power consumption. As mentioned previously, many electronic devices, such as portable radiotelephones, are powered by portable power supplies. When powered by such a portable power supply, the period of operability of an electronic device is limited. By operating the circuitry of the electronic device at a high frequency, the period of operability of the electronic device by a single, portable power supply is reduced.

However, in many electrical circuits, the elements of such circuits are operative only intermittently. In the particular example of a radio transceiver, such as a cellular radiotelephone, elements of the transceiver are operative only during a fraction of the time period during which the transceiver is typically powered.

For instance, the transceiver typically includes various elements interconnected by way of a bus. Information is transmitted between the various elements of the transceiver upon the bus at intermittent intervals.

During other periods, no information is transmitted upon the bus. During such times in which no information is transmitted upon the bus, operation of the circuit at the high frequency is unnecessary. Only when information is to be transmitted upon the bus is operation of the electrical circuit at the high frequency advantageous.

Maximum power savings would, of course, be achieved by shutting off the circuitry of the radiotelephone (i.e., terminating application of power to the circuitry) when no information is to be transmitted upon the bus. However, such a procedure would prevent any subsequent transmission of information upon the bus by any device not controlling the clock.

But, by reducing the frequency of operation of the circuit (i.e., by slowing down the rate at which the circuit is operated) power savings may be effectuated while still permitting subsequent transmission of information upon the bus.

Accordingly, by operating the circuitry of the radiotelephone at the reduced frequency when no information is to be transmitted upon the bus would reduce the amount of power consumed during operation of the radiotelephone, and, by operating the circuitry of the radiotelephone at the increased frequency when information is to be transmitted upon the bus would permit most advantageous operation of the radiotelephone.

Other electronic circuitry may similarly be advantageously operated at such different frequencies of operation similarly to permit most advantageous operation thereof.

Figure 2:
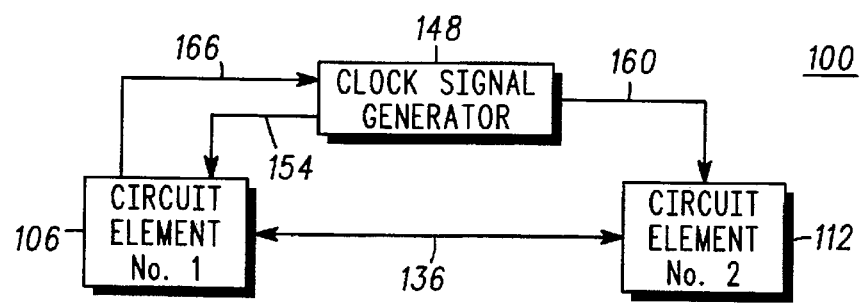
FIG. 2 is a simplified block diagram of the electrical circuit of a preferred embodiment of the present invention.
Figure 2A:
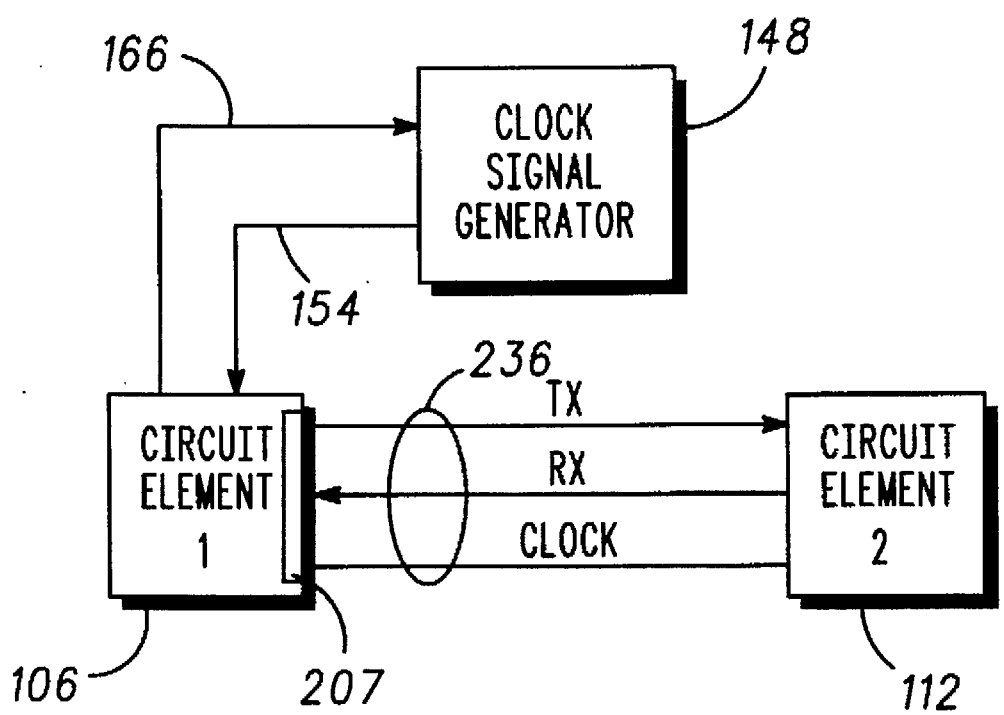
FIG. 2A is a simplified block diagram illustating an alternate embodiment of a bus connecting circuit elements.

Turning next to the simplified block diagram of FIG. 2 and FIG. 2A, the electrical circuit, referred to generally by reference numeral 100, of a preferred embodiment of the present invention is shown. Electrical circuit 100 comprises first circuit element 106 and second circuit element 112 interconnected by bus 136. First circuit element 106 is operative to transmit information upon bus 136 to second circuit element 112. And, second circuit element 112 is operative to transmit information upon the bus to first circuit element 106. Clock signal generator 148 also forms a portion of electrical circuit 100. Clock signal generator 148 generates a clock signal which is supplied to circuit elements 106 and 112, here by way of lines 154 and 160, respectively. In the embodiment of FIG. 2A, circuit element 1 and circuit element 2 are connected via a serial port 207 and serial bus 236. The clock signal is coupled through the serial bus 136 clock conductor, instead of line 160.

Clock signal generator 148 is a variable signal generator which generates clock signals of at least two different frequencies—a first, low-frequency signal and a second, high-frequency signal. In a preferred embodiment of the invention, the high-frequency signal is of a frequency sixteen times that of the low-frequency signal. Line 166 interconnects first circuit element 106 and clock signal generator 148. Line 166 provides a circuit path upon which a control signal generated by first circuit element 106 may be applied to clock signal generator 148 to control selection of the frequency of the clock signal generated thereat.

When neither first circuit element 106 nor second circuit element 112 transmits a signal upon bus 136, clock signal generator 148 is operative to generate a clock signal of the low frequency. As noted hereinabove, when the electrical circuit is operative at the low frequency of operation, the power consumed by the circuit is minimized.

When first circuit element 106 is operative to transmit information upon bus 136 to second circuit element 112, or when circuit element 112 initiates transmission of information to circuit element 106, circuit element 106 provides an indication of such transmission on line 166 to clock signal generator 148. Responsive to such indication, clock signal generator 148 thereafter generates a clock signal of the high-frequency. Generation of the high-frequency clock signal increases the rate of circuit operation and, hence, the rate of information transmission between circuit elements 106 and 112.

Once information transmission between circuit elements 106 and 112 on bus 136 has been completed, an indication of such is provided by circuit element 106 to clock signal generator 148 on line 166. Responsive to such indication, clock signal generator 148 again generates a clock signal of the reduced frequency, thereby to minimize power consumption of electrical circuit 100.

Figure 3:
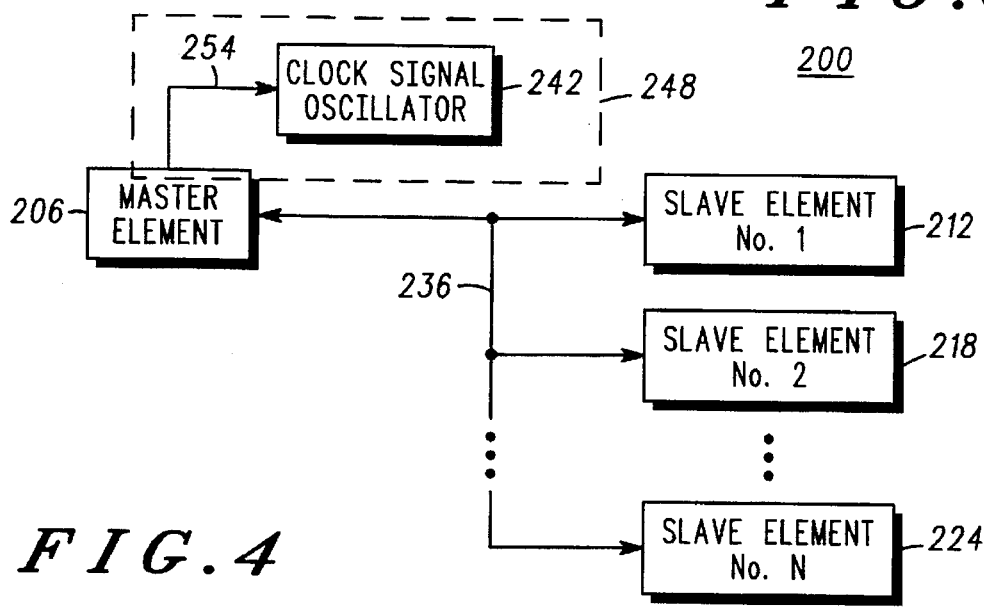
FIG. 3 is a block diagram, similar to that of FIG. 2, but of an alternate, preferred embodiment of the present invention.

Turning next to the block diagram of FIG. 3, an electrical circuit, here referred to generally by reference numeral 200, of an alternate, preferred embodiment of the present invention is shown. Electrical circuit 200 comprises a first circuit element, here master element 206 which is coupled to a plurality of slave elements including first slave element 212, second slave element 218, and nth slave element 224 by way of bus 236 and serial port 307. Bus 236 is a multi-line serial bus including a transmit line for transmitting information from master element 206 to at least one of the slave elements 212–224, at least one receive line permitting transmission of information from a slave element of slave elements 212–224 to master element 206, and a clock line.

Clock signal oscillator 242 also forms a portion of electrical circuit 200. Clock signal oscillator 242 is operative to generate a single-frequency clock signal on line 254 which is applied to master element 206. Master element 206 includes divider circuitry to divide the frequency of the clock signal generated by oscillator 242 by either of at least two values and to generate a clock signal on the clock line of bus 236 of either of at least two frequencies. (For example, in a preferred embodiment, the divider circuitry is operative to divide the frequency of the signal generated by generator 148 by a factor of sixteen or by a factor of one.) Clock signal oscillator 242 and the portion of master element 206 operative to divide the frequency of the clock signal supplied thereto on line 254 are together analogous to clock signal generator 148 of electrical circuit 100 of FIG. 1. Accordingly, block 248, shown in hatch, encompassing clock signal oscillator 242 and a portion of master element 206 shall hereafter be referred to as the clock signal generator of electrical circuit 200.

In a first mode of operation, master element 206 transmits information upon bus 236, and circuitry contained within master element 206 is operative to increase the frequency of the clock signal generated by oscillator 242. In a second mode of operation, one of the slave elements 212–224 initiates transmission of information upon bus 236. Detection by master element 206 of such initiation of transmission by a slave element 212–224 causes the circuitry contained within the master element similarly to increase the frequency of the clock signal generated by oscillator 242.

When information is not transmitted upon either the transmit or receive lines of bus 236 (i.e., when information is not transmitted by either master element 206 or any of the slave elements 212–224), the divider circuitry of master element 206 is operative to cause the clock signal generated by clock signal generator 248 to be of the low frequency, thereby to minimize the rate of power consumption of circuit 200. But, when information is transmitted upon either the transmit or receive lines of bus 236, the divider circuitry of master element 206 is operative to cause the frequency of the clock signal generated by clock signal generator 248 to be of the increased frequency, thereby to maximize the rate of information transfer between the elements 206 and 212–224 of circuit 200. Master element 206 generates signals on the transmit line of bus 236 to one or more of the slave elements 212–224.

Upon indication that master element 206 is transmitting information to one or more of the slave elements 212–224, or upon detection that one of the slave elements 212–224 is initiating transmission of information upon bus 236, the clock signal generated by clock signal generator 248 is increased in frequency from the low-frequency level to the high-frequency level. When information is no longer transmitted upon either the transmit or the receive lines of bus 236, the clock signal generated by clock signal generator 248 is again reduced in frequency. The subsequent reduction in frequency of the clock signal generated by clock signal generator 248 may be delayed in time, if desired.

It should be noted that slave elements 212–224 of FIG. 3 are referred to as such because none of the slave elements 212–224 control directly the frequency of the clock signal generated by clock signal generator 248. Rather, only master element 206 operates to control directly the frequency of the clock signal generated by the clock signal generator and is, accordingly, referred to as the master element solely for such reason.

Figure 4:
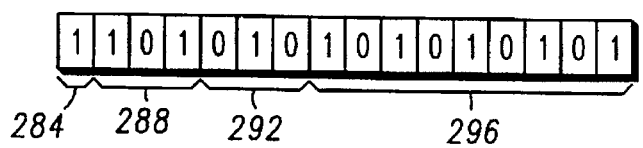
FIG. 4 is a diagram illustrating the format of a digital word transmitted between elements of the circuit of the preferred embodiment of the present invention.

FIG. 4 is a diagram illustrating the format of a digital word which may be transmitted between elements of electrical circuits 100 or 200 of FIGS. 2 or 3, respectively. The format of the word illustrated in the figure is for purposes of illustration only; any of many other word formats may similarly be transmitted between elements of the circuits 100 and 200.

As illustrated, word 280 is sixteen bits in length wherein a first bit of the sixteen bit word 280 comprises a start bit denoted by the bit encompassed by bracket 284. Three sequential bits which immediately succeed the start bit define the destination address, denoted by the bits encompassed by bracket 288. (It should be noted that, because information is transmitted between only two circuit elements in electrical circuit 100 of FIG. 2, no destination address would be necessitated.) Three bits immediately succeeding the destination address comprise a source address, here denoted by the bits encompassed by bracket 292. (Again, when words similar to word 280 are transmitted between the circuit elements of electrical circuit 100 of FIG. 2, no source address is necessitated for reasons analogous to the reasons for which no destination address is necessitated.) While source and destination addresses are indicated to be three bits in length, such address length is for a system having up to eight elements. A system having a greater number of elements would, of course, require an increased number of bits to form the source and destination addresses.

Bits succeeding the source address form the data, encompassed by bracket 296, other than the source and destination addresses.

In the preferred embodiments, the start bit of word 280 is always comprised of a logical one. Detection of a logical one upon a bus provides the indication to alter the frequency of the clock signal generated by the clock signal generator of the electrical circuit to cause the clock signal generator to generate a clock signal of an increased frequency. After transmission of the information, such as word 280, has been completed, no logical ones are transmitted upon the bus interconnecting the elements of the circuit. When a selected period of time has elapsed without detection of a logical one upon the bus, an indication is provided to cause reduction in the frequency of the clock signal generated by the clock signal generator.

Figure 5:
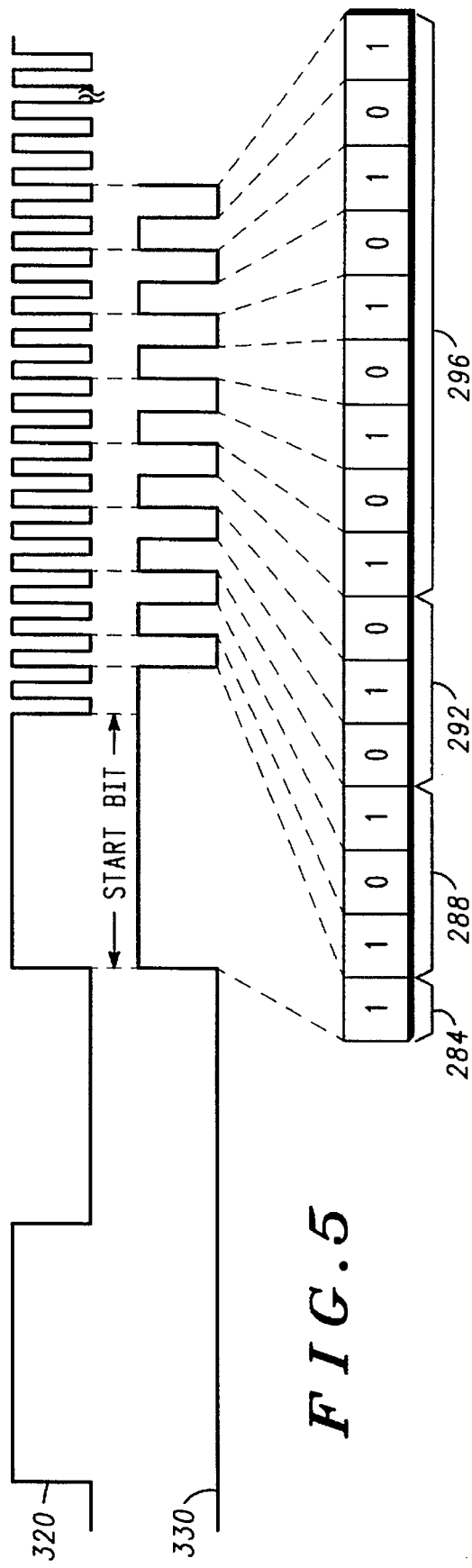
FIG. 5 is a timing diagram illustrating the timing relationship between the clock frequency and transmission of information during operation of the electrical circuit, and associated method, of the preferred embodiment of the present invention.

FIG. 5 is a timing diagram illustrating the timing relationship between the clock frequency and transmission of information during operation of the electrical circuit (such as circuits 100 or 200 of FIGS. 2 or 3, respectively), and the associated method, of the preferred embodiments of the present invention. Word 280, previously illustrated in FIG. 4 is again shown, here beneath curves 320 and 330.

Curve 320 is representative of a clock signal generated by a clock signal generator, such as clock signal generator 148 or 248 of FIGS. 2 or 3, respectively. Here, the clock signal is of a frequency either of a first, reduced level or a second, increased level which is of a frequency sixteen times the frequency of the first frequency. Prior to transmission of information upon a bus, the clock signal is generated to be of a frequency of the first, reduced-level frequency. Such reduced-level frequency defines the frequency of the left-hand side portion of curve 320.

When information is transmitted upon the bus, as evidenced by detection of a start bit, the frequency of the clock signal is increased sixteen-fold. Accordingly, the right-hand side portion of curve 320 illustrates the clock signal when generated at the second frequency.

Curve 330 is representative of the start bit and the information generated upon a bus connecting elements of a circuit, such as circuit 100 or 200 of FIGS. 2 or 3. It should be noted that, with respect to circuit 200, a start bit is generated when one of the slave elements 212–224 initiates transmission of information upon bus 236. (Conversely, when master element 206 transmits information upon bus 236, no start bit is required as circuitry internal to master element 206 directly causes the frequency of the clock signal to be increased.) Accordingly, with respect to circuit 200 of FIG. 3, curve 330 is representative of signals generated by one of the slave elements 212–224.

The left-hand side portion of curve 330 is representative of a time period prior to initiation of transmission of information, then a bit of information, here the start bit generated upon a bus when the circuit is operative at the low frequency of operation. The right-hand side portion of the curve 330 corresponds to the right-hand side portion of curve 320 and illustrates transmission of information upon a bus when the circuit is operated at the high frequency.

Because the circuit is operated at the high frequency, information is transmitted at a much higher rate, as evidenced by the right-hand side portion of curve 330, than when the circuit is operated at the low frequency, albeit at an increased power rate. However, when information is not transmitted upon the bus, the clock signal generator generates the clock signal to be of the low frequency, thereby to minimize power consumption of the circuit.

By way of an example, if a gate array comprising a circuit element is formed of five hundred gates, each of which dissipates power at a rate of 6 microwatts, and the clock signal generated by a clock signal generator, when of the level of the low frequency is 62,500 kHz, the power consumption of a gate array comprising circuit element 106 of electrical circuit 100 or master element 206 of electrical circuit 200 is approximately 188 microwatts. When the clock signal generated by the clock signal generator is increased in frequency by a sixteen-fold increase, the power consumption of the gate array comprising element 106 or 206 is approximately 3 milliwatts. As the clock signal generator generates the clock signal of the increased frequency only during times in which information is transmitted upon a bus, the rate of power consumption is much reduced when compared to circuitry operative only at the increased frequency.

Figure 6:
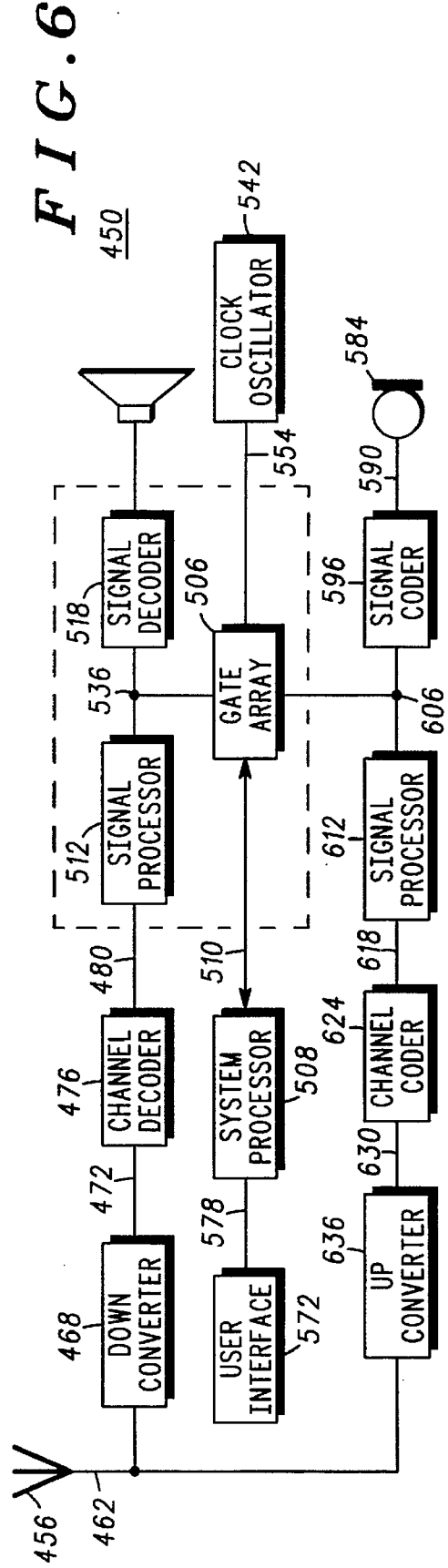
FIG. 6 is a block diagram of a radio transceiver of a preferred embodiment of the present invention which incorporates the circuit, and associated method, shown in preceding figures of the drawings.

FIG. 6 is a block diagram of a radio transceiver, referred to generally by reference numeral 450, of a preferred embodiment of the present invention which incorporates a circuit similar to electrical circuit 200 shown in FIG. 3.

A signal transmitted to transceiver 450 is received by antenna 456 and converted into an electrical signal on line 462. Line 462 is coupled to down converter circuit 468 which converts the signal supplied thereto on line 462 downward in frequency. Down converter 468 generates a down-converted signal on line 472 which is supplied to channel decoder 476. Channel decoder 476 is operative to remove redundancies introduced upon a signal prior to transmission to transceiver 450 and to generate a decoded signal on line 480.

Block 500, shown in hatch, is also illustrated in the figure and corresponds to circuit 200 of FIG. 3; block 500 is shown in the block diagram of FIG. 6 merely for purposes of comparison with analogous circuitry of FIG. 3.

Gate array 506 forms a master element which is coupled to system processor 508 by way of lines 510. Gate array 506 is further coupled to signal processor 512 and signal decoder 518 by way of bus 536. Gate array 506 is further coupled to clock signal oscillator 542 by way of line 554. Signal processor 512 and signal decoder 518 comprise slave elements operative together with gate array 506 in manners analogous to the operative relationship between elements 206 and 212–224 of FIG. 3.

The signal generated by channel decoder 476 on line 480 is supplied to signal processor 512 which is operative to perform desired signal processing functions. Signal processor 512 is analogous to one of the slave elements 212–224 of circuit 200 of FIG. 3. When signal processor 512 is to generate an information signal on line 536, the processor 512 first generates a start bit which is detected by gate array 506. Gate array 506, analogous to master element 206 of circuit 200, includes circuitry which divides the frequency of the clock signal generated by clock oscillator 542 and supplied on line 554 to array 506. When a start bit is detected, gate array 506 causes a clock signal generated upon a clock line of bus 536 to be of an increased frequency.

As illustrated, bus 536 interconnects signal processor 512 and signal decoder 518. Signal decoder 518 is operative to receive signals transmitted thereto upon bus 536 by processor 512 and to decode the signals supplied thereto. Signal decoder 518 is further operative in a master/slave relationship with gate array 506 and is operative to generate a decoded signal on line 560 which is coupled to a transducer, such as speaker 566.

The circuit comprised of gate array 506, signal processor 512, signal decoder 518, and bus 536 is operated at an increased frequency for so long as information is transmitted upon the bus, thereby to maximize the rate at which information is transmitted.

The block diagram of FIG. 6 further illustrates user interface 572 which is coupled to system processor 508 by way of line 578. The user interface 572 includes interfaces such as a keypad having actuation switches and light emitting diodes forming visual outputs.

A bottom portion of radio transceiver 450 comprises a transmitter portion thereof and is shown to include a transducer, here microphone 584 which converts a signal into electrical form on line 590 which is supplied to signal coder 596. Signal coder codes the signal applied thereto and generates a coded signal on line 606 which is supplied to signal processor 612. Signal processor 612 generates a signal on line 618 which is supplied to channel decoder 624 which is operative in a manner reverse to that of channel decoder 476 of the receiver portion of transceiver 450. Decoder 624 generates a coded signal on line 630 which is supplied to up converter 636. Up converter 636 is operative to up-convert in frequency the signal supplied thereto on line 630 and to supply the up-converted signal generated thereat on line 462 to antenna 456 for transmission therefrom.

Gate array 506 is operative also to control the frequency at which information is transmitted upon line 606 in manners analogous to the manner in which gate array 506 controls the frequency at which information is transmitted upon line 536.

The circuit comprised of gate array 506, signal coder 596, bus 606 and signal processor 612 is operative in a manner analogous to operation of the circuit comprised of array 506, processor 512, decoder 518, and bus 536. When signal coder 596 is to generate a signal on bus 606, coder 596 first generates a start bit which is detected by gate array 506. When gate array 506 detects such start bit, the gate array causes the frequency of operation of the circuit to be increased, again to maximize the rate at which information is transmitted.

Because the circuitry of transceiver 450 is operative at the high frequency level and corresponding high power consumption rate only during times in which information is to be transmitted between elements thereof, power consumption of the elements of transceiver 450 are minimized while still permitting information transfer between elements thereof at a high frequency rate of transmission.

Figure 7:
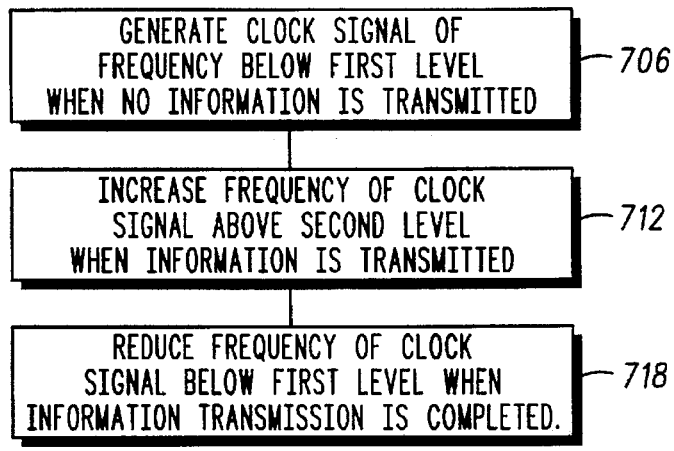
FIG. 7 is a logical flow diagram listing the method steps of the method of the preferred embodiment of the present invention.

Turning next to the logical flow diagram of FIG. 7, the method steps, referred to generally by reference numeral 700, of the method of the preferred embodiment of the present invention are listed. The method of the preferred embodiment minimizes power consumption of an electrical circuit comprised of at least two circuit elements interconnected by a bus and of a clock signal generator which generates a clock signal alternately of a frequency below a first level or of a frequency above a second level.

First, and as indicated by block 706, the clock signal of the frequency below the first level is generated when none of the at least two circuit elements interconnected by the bus transmit information thereupon.

Next, and as indicated by block 712, the frequency of the clock signal is increased to the frequency above the second level when a circuit element of the at least two circuit elements interconnected by the bus transmits information thereupon.

Next, and as indicated by block 718, the frequency of the clock signal is reduced to the frequency below the first level when the circuit element of the at least two circuit elements completes transmission of the information upon the bus.

Figure 8:
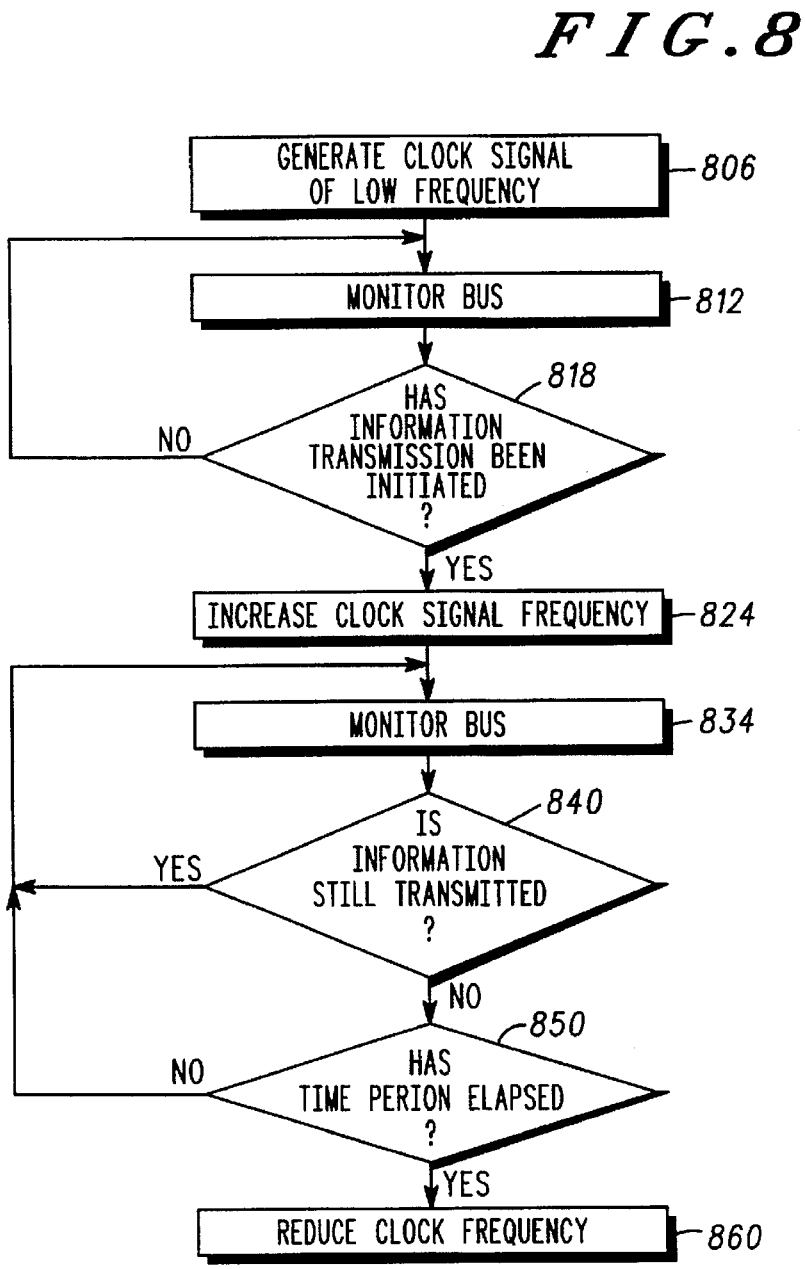
FIG. 8 is a flow diagram of an algorithm incorporating the method of the preferred embodiment of the present invention.

FIG. 8 is a flow diagram of an algorithm illustrating operation of a preferred embodiment of the method of the present invention.

When no information is transmitted upon the bus, the clock signal generated by the clock signal generator is of a low frequency. Here, such is indicated as an initial condition, represented by block 806.

The bus is monitored, indicated by block 812, to detect the presence of information transmitted thereupon. A determination is made, as indicated by decision block 818, as to whether information transmission has been initiated upon the bus, here by detection of a start bit.

If no information is detected, the no branch is taken, and the bus is continued to be monitored. If a start bit has been detected, the yes branch is taken from decision block 818, and the clock signal generated by the clock signal generator is increased in frequency, as indicated by block 824.

The bus is again monitored, as indicated by block 834, and a determination is made as to whether information is continued to be transmitted on the bus. If so, the yes branch is taken and monitoring of the bus continues. If information is no longer transmitted upon the bus, the no branch is taken from decision block 840, and a determination is made as to whether information has not been transmitted for a selected time period, as indicated by decision block 850. If the selected time period has not elapsed, the no branch is taken, and the bus is continued to be monitored. Otherwise, the yes branch is taken from decision block 850, the frequency of the clock signal generated by the clock signal generator is reduced, as indicated by block 860, and the bus is again monitored to detect the presence of transmission again of information upon the bus.

While the present invention has been described in connection with the preferred embodiments of the various figures, it is to be understood that other similar embodiments may be made and modifications and additions may be made to the described embodiments for performing the same functions of the present invention without deviating therefrom. Therefore, the present invention should not be limited to any single embodiment, but rather construed in breadth and scope in accordance with the recitation of the appended claims.

What is claimed is:

1. A method for minimizing power consumption of an electrical circuit including at least one circuit element connected by a serial bus to a serial port of a processor circuit having an associated clock signal generator which generates a clock signal alternately of a first non-zero frequency below a first level or of a second frequency above the first level, the clock signal applied to the serial bus for setting the clock signal frequency for the serial bus, and the processor circuit operable to transmit and receive signals over the serial bus, wherein the electrical circuit consumes power at a first rate when the clock signal is of the first frequency and wherein the electrical circuit consumes power at a second rate when the clock signal is of the second frequency, said method comprising the steps of:

generating the clock signal of the first frequency when the at least one circuit element and the processor circuit interconnected by the serial bus are not transmitting information upon the serial bus;

monitoring the serial bus in the processor circuit to detect generation of an information-transmission initiation signal by the at least one circuit element;

maintaining by the processor circuit the frequency of the clock signal on the serial bus at the first frequency so long as no information-transmission initiation signal is detected during said step of monitoring;

generating an information-transmission initiation signal in the at least one circuit element on the serial bus just prior to transmission of the information on the serial bus;

increasing by the processor of the frequency of the clock signal on the serial bus to the second frequency when the information-transmission initiation signal is detected during said step of monitoring; and reducing the frequency of the clock signal on the serial bus to the first frequency after the at least one circuit element and the processor complete transmission of information upon the serial bus whereby the power demands of the electrical circuit are reduced.

2. The method of claim 1 wherein said step of reducing the frequency of the clock signal when no information is generated comprises reducing the frequency of the clock signal a predetermined period of time after no information is detected during said step of monitoring.

3. The method as defined in claim 1, further including the step of increasing the clock frequency of the clock signal generator to the second frequency prior to transmission of a communication signal over the communication bus by the processor circuit if the processor initiates communication on the serial bus.

4. An electrical circuit comprising:

a serial bus;

a system processor circuit including a processor, a serial port coupled to the serial bus, and a clock signal generator coupled to the serial port to provide a clock signal to the serial bus, the processor circuit operative to vary the clock signal frequency on the serial bus, to generate an information signal for communication over the serial bus, the serial bus clock signal controlled to have a non-zero frequency below a first level during non-communication, and the serial bus clock signal controlled to have a frequency above the first level during communication, the system processor operative to increase the clock signal frequency responsive to an information-transmission initiation signal on the serial bus; and at least one circuit element coupled to the system processor through the serial bus and operative to transmit the information-transmission initiation signal prior to communicating over the serial bus, and the at least one circuit element operating at a frequency directly proportional to the clock frequency of the serial bus;

whereby the processor is responsive to the clock signal to adjust the operating frequency thereof such that serial bus communication is at a high rate during times of communication and the serial bus operates at a low rate at other times to conserve energy.

5. The electrical circuit of claim 4 wherein the system processor is operative both to originate information signal transmission upon the serial bus and to receive an information signal through the serial bus.

6. The electrical circuit of claim 5 wherein the processor is operative to increase the clock rate prior to initiating communication on the serial bus.

7. The electrical circuit of claim 4 wherein said serial bus interconnecting the system processor and the at least one circuit element comprises a multi-wire bus having a first bus line forming a transmit line, a second bus line forming a receive line, and a third bus line forming a clock line for transmitting the clock signal generated by the clock signal generator.

8. The electrical circuit of claim 7 wherein the clock signal generator supplies the clock signal to the processor, and the processor, in turn, supplies the clock signal to the clock line of the multi-wire bus.

9. The electrical circuit of claim 8 wherein the processor controls the clock signal generator to generate the clock signal of the first frequency a predetermined time period after the circuit element completes transmission of the information signal upon the bus.

10. A serial bus communication system, comprising:

a serial bus including a first unidirectional conductor, a second unidirectional conductor, and a clock conductor;

a system processor including a serial port coupled to the serial bus and a clock signal generator coupled to the serial port for generating a clock signal on the clock conductor of the serial bus, the system processor operative to receive a transmission initiation signal and to control the clock signal generator output frequency supplied to the clock conductor;

a element coupled to the serial bus, the element responsive to a signal input thereto to generate the transmission initiation signal supplied to the system processor prior to communicating, the element communicating at a frequency controlled by the clock signal frequency;

wherein the processor element is responsive to an information-transmission initiation signal to increase the clock frequency on the serial bus, whereby the element and the processor communicate at a higher frequency after receipt of the information-transmission initiation signal to communicate information over the serial bus, and the processor reducing the clock frequency on the serial bus at the conclusion of communication between the processor and the element to conserve energy.

* * * * *